United States Patent [19]

Hakka et al.

[11] Patent Number: 5,262,139
[45] Date of Patent: Nov. 16, 1993

[54] REMOVAL OF SULFUR DIOXIDE FROM GAS STREAMS

[75] Inventors: Leo E. Hakka, Dollard Des Ormeaux; Paul J. Parisi, Saint Lambert, both of Canada

[73] Assignee: Union Carbide Chemicals & Plastics Technology Corporation, Danbury, Conn.

[21] Appl. No.: 953,505

[22] Filed: Sep. 29, 1992

[51] Int. Cl.⁵ .................... C01B 17/20; C01B 17/00
[52] U.S. Cl. .................... 423/242.7; 423/243.01
[58] Field of Search .................... 423/243.01, 243.08, 423/243.09, 242.7

[56] References Cited

U.S. PATENT DOCUMENTS

| | | | |
|---|---|---|---|
| 3,503,185 | 3/1970 | Delzenne et al. | 55/73 |
| 3,790,660 | 2/1974 | Earl et al. | 423/242 |
| 3,904,735 | 9/1975 | Atwood et al. | 423/243 |
| 4,071,602 | 1/1978 | Pearce | 423/243 |
| 4,080,423 | 3/1978 | Smith et al. | 423/210 |
| 4,122,149 | 10/1978 | Dunnery et al. | 423/242 |
| 4,170,628 | 10/1979 | Kosseim et al. | 423/243 |
| 4,201,752 | 5/1980 | Kosseim et al. | 423/235 |
| 4,208,387 | 6/1980 | Klass et al. | 423/243 |
| 4,389,383 | 6/1983 | Sokolik, Jr. et al. | 423/243 |
| 4,530,704 | 7/1985 | Jones et al. | 55/48 |
| 4,783,327 | 11/1988 | Treybig et al. | 423/243 |
| 5,019,361 | 5/1991 | Hakka | 423/243 |
| 5,108,723 | 4/1992 | Chang et al. | 423/242.7 |

*Primary Examiner*—Gregory A. Heller
*Attorney, Agent, or Firm*—W. K. Volles

[57] ABSTRACT

Processes for the removal of sulfur dioxide from gas streams, e.g., stack gases, are disclosed wherein the absorption occurs in the presence of a diamine. The first amine group, i.e., stronger amine group, of the diamine is in salt form, having sulfite anions associated therewith, and absorbs by a sulfite/bisulfite absorption mechanism. The second amine groups absorbs sulfur dioxide in free base form. The sulfite salt on the first amine group is maintained by controlling the level of heat stable salts in the absorbent. Both the first and second amine groups can be conveniently regenerated together, e.g., by steam stripping.

20 Claims, 2 Drawing Sheets

REMOVAL OF SULFUR DIOXIDE FROM GAS STREAMS

FIELD OF THE INVENTION

The present invention relates to the absorption of sulfur dioxide from gas streams. More specifically, the present invention relates to improved processes for absorbing sulfur dioxide with a diamine wherein both amine groups provide absorption capacity for sulfur dioxide.

BACKGROUND OF THE INVENTION

Sulfur dioxide is commonly present in effluent gas streams from a variety of commercial sources such as, for example, stack gases from coal fired power plants, industrial boilers, metallurgical roasting operations and as tail gas streams from Claus sulfur plants, refineries and chemical plants.

A wide variety of absorption processes have been proposed which utilize absorbents including, for example, lime, limestone, sodium hydroxide, soda ash, sodium sulfite and various amines.

One particularly useful process described in U.S. Pat. No. 5,019,361, issued May 28, 1991, discloses the use of an aqueous absorbing medium containing a water soluble half-salt of a diamine, wherein the diamine in free base form has a molecular weight of less than about 300 and wherein the diamine in half-salt form has a pKa value for the free nitrogen atom of from about 4.5 to 7.3. The process disclosed by the patentees has been useful because the absorbent is regenerable, thereby, permitting cyclic operation. In addition, because the absorbent comprises a half-salt of a diamine, i.e., one amine group is in salt form, the absorbent is substantially nonvolatile and accordingly absorbent losses, e.g., during absorption and regeneration, can be minimized.

The current trend in environmental regulations has been to limit the amount of sulfur dioxide emissions to the atmosphere to lower levels than have been previously permitted. As a result, improved absorption processes and improved absorbents are desired which can provide increased capacity for sulfur dioxide and which can provide reduced levels of sulfur dioxide in the effluent gases emitted to the atmosphere. Moreover, it is further desired that the absorbents used in such processes be easily regenerable and have low volatility in order to reduce solvent losses.

SUMMARY OF THE INVENTION

By the present invention, improved processes for the removal of sulfur dioxide from gas streams are provided wherein the absorbent used in the absorption process comprises a diamine which can provide absorption capacity from both amine groups. The first amine group, i.e., stronger amine, absorbs sulfur dioxide by the sulfite/bisulfite mechanism, whereas the second amine group, i.e., weaker amine, absorbs sulfur dioxide in free base form. By carefully controlling the level of heat stable salts, the first amine group can be maintained in a salt form having sulfite anions associated therewith. The sulfite anions are converted to bisulfite anions when absorption of sulfur dioxide occurs. The bisulfite anions can then be conveniently regenerated back to sulfite anions in the same regeneration zone, e.g., steam stripper, where regeneration to the free base amine occurs.

In one aspect of the present invention, there is provided a process for removing sulfur dioxide from a gas stream which comprises the steps of:

(a) passing the feed gas stream to a primary absorption zone wherein the feed gas stream is contacted with a primary lean solvent stream containing water and a regenerated diamine at conditions effective to absorb sulfur dioxide wherein said regenerated diamine comprises;

(i) a first amine group in salt form having sulfite anions associated therewith, wherein the sulfite anions have absorption capacity for sulfur dioxide; and (ii) a second amine group in free base form, wherein the second amine group has absorption capacity for sulfur dioxide;

wherein during said absorption contacting, sulfite anions are converted to bisulfite anions and the second amine group is protonated to form a spent diamine, and heat stable salts having heat stable anions associated therewith are formed as a by-product;

(b) withdrawing a primary effluent gas stream at least partially depleted in sulfur dioxide from the primary absorption zone;

(c) withdrawing primary rich solvent stream comprising sulfur dioxide, heat stable salts and said spent diamine from the primary absorption zone;

(d) passing the primary rich solvent stream to a regeneration zone wherein the rich solvent stream is regenerated at conditions effective to desorb sulfur dioxide; wherein during said regeneration, bisulfite anions are converted to sulfite anions, and the second amine group is converted to free base form;

(e) withdrawing a tail gas stream comprising sulfur dioxide from the regeneration zone;

(f) withdrawing a regenerated solvent stream comprising the regenerated diamine, water and heat stable salts from the regeneration zone;

(g) removing heat stables anions from the heat stable salts in at least one of the primary rich solvent stream or the regenerated solvent stream; and (h) recycling at least a portion of the regenerated solvent stream to the primary absorption zone to comprise at least a portion of the primary lean solvent stream.

DETAILED DESCRIPTION OF THE INVENTION

Figure 1:
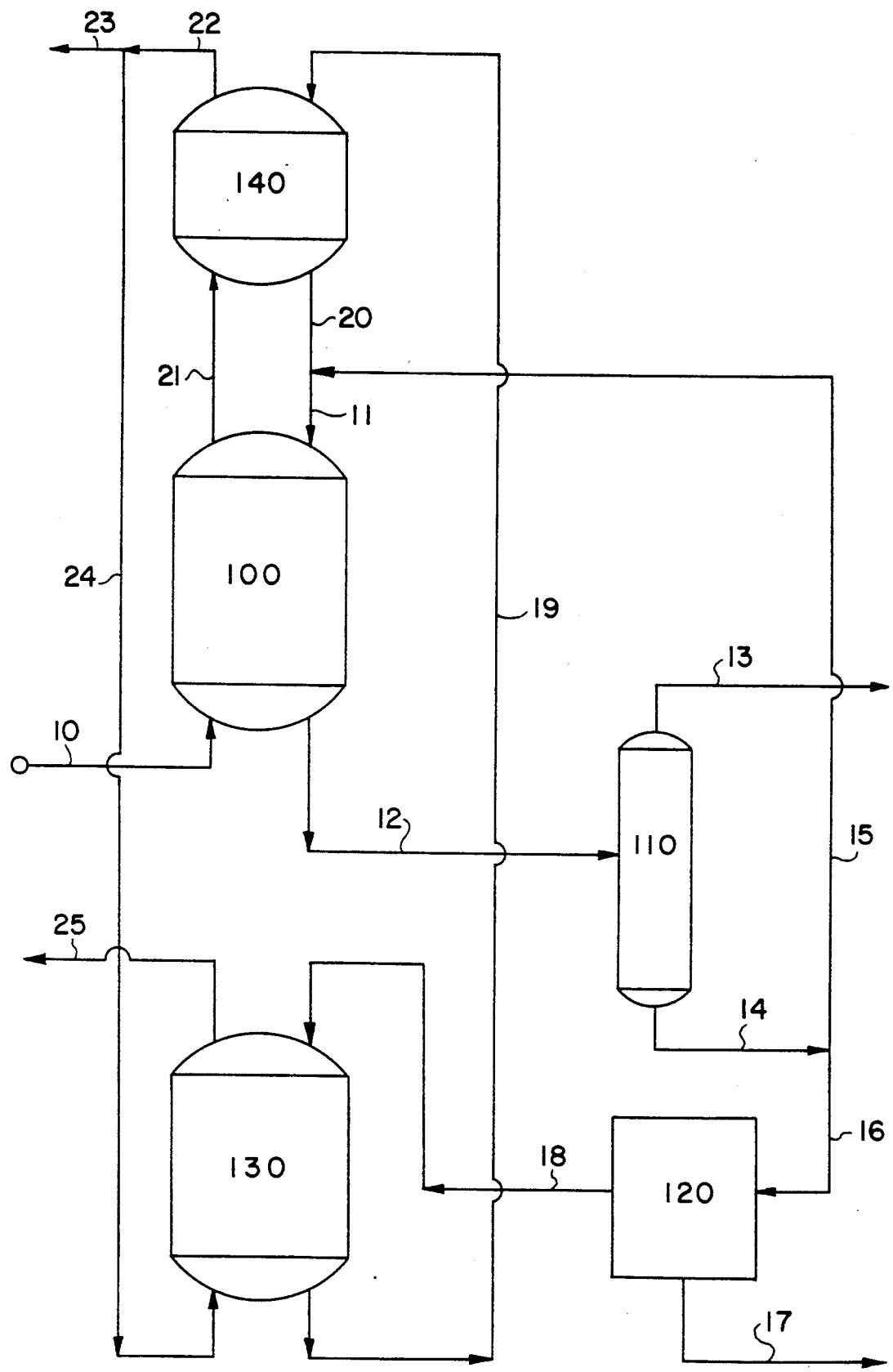
FIG. 1 illustrates a process flow diagram in accordance with the present invention.

The absorbent used in the process of the present invention comprises a diamine. In free amine form the diamine can be represented by the structural formula:

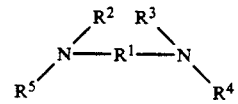

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (e.g., 7 to about 20 carbon atoms), aryl (often monocyclic or bicyclic), alkaryl (e.g., 7 to about 20 carbon atoms), and any of $R^2$, $R^3$, $R^4$, and $R^5$ may form cyclic structures. The diamines preferably are tertiary diamines, in view of their stability. However, other diamines in which one or both of the nitrogens is primary or secondary may be employed, provided mild oxidative or thermal conditions exist to minimize chemical reaction of the absorbent. Often, the preferred diamines have a hydroxyalkyl group as a substituent on an amine group. Those skilled in the art will recognize that although the present invention is described herein in terms of a diamine, polyamines, i.e., containing more than two amine groups are intended to be included within the scope of the invention.

To enable a high loading of recoverable sulfur dioxide to be absorbed under essentially atmospheric pressure conditions, it is preferable for the free amine form of the absorbent to have a molecular weight less than about 300, preferably less than about 250. Often the tertiary diamines are of the formula:

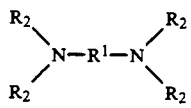

wherein $R_1$ is an alkylene group, preferably containing from 2 to 3 carbon atoms as a straight chain or as a branched chain, and each $R_2$ is the same or different and is an alkyl group, preferably methyl or ethyl, or a hydroxy-alkyl group, preferably 2-hydroxyethyl.

Preferably, the pKa value of the first amine group, i.e., stronger amine, of the diamine is from about 8.0 to 10.6. Preferably, the pKa value of the second amine group, i.e., weaker nitrogen, is from about 4.5 to 7.3. Since the pKa of an amine varies with temperature, for the sake of uniformity all pKa values referred to herein are those measured at 25° C. Examples of preferred diamines in free base form include:
N,N',N'-(trimethyl)-N-(2-hydroxyethyl)-ethylenediamine,
N,N,N',N'-tetramethyl-ethylenediamine,
N,N,N',N'-tetramethyl-diaminomethane,
N,N,N',N'-tetrakis-(2-hydroxyethyl)-ethylenediamine,
N,N'-dimethylpiperazine,
N,N,N',N'-tetrakis-(2-hydroxyethyl)-1,3-diaminopropane, N',N'-dimethyl-N,
N-bis(2-hydroxyethyl)-ethylenediamine,
N-methyl,N'-(2-hydroxyethyl)-piperazine,
N-(2-hydroxyethyl)-piperazine, N,N'-bis (2-hydroxyethyl)-piperazine, N-methyl-piperazine, and piperazine. Mixtures of such amines are also preferred. Especially Preferred amines include
N,N',N'-(trimethyl)-N-(2-hydroxyethyl)-ethylenediamine,
N-methyl,N'-(2-hydroxyethyl)-piperazine,
N-(2-hydroxyethyl)-piperazine, and
N,N'-bis(2-hydroxyethyl)-piperazine.

In accordance with the present invention, the diamine provides dual functionality with respect to absorption of sulfur dioxide. The first amine group is maintained in a salt form and absorbs by a sulfite/bisulfite mechanism. Thus, at the beginning of absorption the first amine group is in a salt form associated with sulfite anions. As used herein, the term "sulfite anions" means sulfite anions as $SO_3^{-2}$ or disulfite anions (also known as pyrosulfite anions) as $S_2O_5^{-2}$. As absorption proceeds, sulfur dioxide is absorbed and the sulfite anions converted to bisulfite anions. Thus at the end of absorption, the first amine group is in a salt form associated with bisulfite anions. The second amine group is in free base form at the beginning of absorption and is protonated when sulfur dioxide is absorbed and is associated with bisulfite anions at the end of absorption.

Thus, by the present invention, the benefits of low volatility of an amine in salt form are obtained, while providing absorption capacity through both amine groups. As a result, an increase in absorption capacity is often achieved with the absorbent of the present invention as compared to a diamine absorbent wherein the first amine group does not contribute absorption functionality. Typically, the increase in absorption capacity for sulfur dioxide for the absorbent of the present invention will be at least 10%, preferably at least 25%, more preferably at least 50% and most preferably at least 100% as compared to an absorbent where the first amine group is associated with a heat stable salt.

In addition to the increased capacity for sulfur dioxide, another advantage to the process of the present invention is that both the first and second amine groups of the diamine can be conveniently regenerated in the same regeneration zone, e.g., by steam stripping. Thus, during regeneration, the bisulfite anions associated with the first amine group in salt form are converted to sulfite anions and the second amine group is converted from its protonated form to its free amine form. Both of these regeneration mechanisms can occur simultaneously during regeneration of the diamine absorbent.

Heat stable salts are commonly formed in sulfur dioxide absorption processes during both the absorption and regeneration steps as a by-product. Heat stable salts can be formed, for example, when strong acids such as hydrochloric acid or sulfuric acid are present in the feed gas. Heat stable salts can also be formed when sulfite anions are oxidized to sulfate anions. As used herein, the term "heat stable salts" means any amine salt which cannot be regenerated under the conditions that the second amine group of the diamine can be regenerated. For example, typical conditions for regenerating the second amine group of the diamine include steam stripping in a distillation column at a temperature of from about 150° to 300° F. at about atmospheric pressure. Typical ions which form heat stable salts i.e., heat stable anions, include, for example, sulfate anions and thiosulfate anions.

In order to provide absorption functionality to the first amine group of the diamine, it is critical in accordance with the present invention to maintain the level of heat stable salts in the regenerated absorbent, e.g., lean solvent feed to the absorption zone, at a level low enough to maintain the first amine group in a salt form having sulfite anions associated therewith. Preferably, the level of heat stable salts in the regenerated absorbent is less than about 1 equivalent of heat stable salt per mole of diamine, more preferably less than about 0.8 equivalent Per mole of diamine and, most preferably, from about 0.1 to 0.6 equivalent per mole of diamine. In addition, it is preferred that at least about 20 percent, on average, of the first amine groups in salt form be associated with sulfite anions and, more preferably, at least about 50 percent, on average, of the first amine groups in salt form being associated with sulfite anions.

The heat stable anions can be removed from the heat stable salts in the process by any convenient means.

Preferably, the heat stable anion will be removed from the process but the amine which comprised the salt will be retained by the process, e.g., converted to a regenerable salt such as an amine sulfite or a free amine. Occasionally, the rate of generation of heat stable salts will be low enough so that removal of the heat stable anions from the heat stable salts in the the primary rich solvent stream or the regenerated solvent stream, or both, occurs through process losses, e.g., with the products, by pump and valve leakage, etc. More typically, it will be desirable to perform a separate step to remove the heat stable anions. Typical methods include, for example, ion exchange, distillation, electrodialysis, filtration and precipitation e.g., with alcohols. Further details concerning these methods are known to those skilled in the art. Preferably, the regenerated absorbent is treated to remove the heat stable anions from the heat stable salts. Since some of the above-described methods may introduce other ingredients to the process, e.g, sodium hydroxide or calcium hydroxide. Thus, the heat stable anion removed from the process may be in the form of a calcium salt or a sodium salt, for example.

After treatment to remove heat stable anions, the absorbent typically comprises, on average, from 0 to 1 equivalent of heat stable salt per mole of diamine, preferably from about 0 to 0.5 equivalent per mole of diamine and, more preferably, from about 0 to 0.2 equivalent per mole of diamine. In addition, it is preferred that at least about 60 percent and more preferably at least about 75 percent, of the amine groups in the diamine are in free base form after treatment to remove heat stable anions.

Typically, only a slip stream of the regenerated absorbent needs to be treated for heat stable anion removal. Quite surprisingly, it has been found that only a small fraction, preferably less than about 10 percent, more preferably less than about 5 percent, and most preferably less than about 2 percent of the total amount of regenerated absorbent needs to be treated for heat stable anion removal in order to achieve a substantial increase in the absorption capacity for sulfur dioxide. As used herein, the term "substantial increase" means at least about a 20 percent increase, preferably at least about a 50 percent increase, and more preferably at least about a 100 percent increase in absorption capacity for sulfur dioxide, as compared to a diamine where the first amine group is in a salt form having heat stable anions associated therewith. In addition to providing increased capacity for sulfur dioxide, the presence of sulfite anions is believed to retard the precipitation of elemental sulfur which can occur when the level of heat stable salts is greater than about 1 equivalent per mole of diamine.

The treated absorbent from the heat stable salt removal step often has a high capacity for sulfur dioxide since a large proportion of the first amine groups and essentially all of the second amine groups are in free base form.

In one aspect of the present invention, the treated absorbent is combined with the remaining portion of the regenerated absorbent, i.e., the portion not treated for heat stable salt removal, to comprise a lean absorbent which can be used to absorb sulfur dioxide. It is believed that, as a result of such combination, equilibrium causes the first amine group in free base form to protonate and form a salt associated with sulfite anions. As a result of the partial salt formation, the diamine is rendered nonvolatile, Yet still has absorption capacity for sulfur dioxide through the sulfite/bisulfite cycle.

In another aspect of the invention, the treated absorbent is used to absorb sulfur dioxide from the product gas of the primary absorption step. For example, a typical feedstream may contain about 5000 parts per million volume ("ppmv") of sulfur dioxide. After absorbing sulfur dioxide in the primary absorption zone with the diamine wherein the first amine group is in salt form associated with sulfite anions and the second amine group is in free base form, the product gas may contain about 100 ppmv of sulfur dioxide. By contacting the product gas in a secondary absorption zone with the treated absorbent wherein both amine groups are in free base form, the sulfur dioxide content in the product gas can be further reduced to a level preferably lower than about 10 ppmv, and more preferably to a level of less than about 5 ppmv of sulfur dioxide. The primary and secondary absorption zones may be in the same absorber vessel or in separate absorber vessels. In this aspect of the invention, a product gas having higher purity is achieved in addition to providing increased capacity for sulfur dioxide.

When the secondary absorption zone is employed, the L/G ratio is preferably greater than about 0.1, more preferably greater than about 0.25, and most preferably greater than about 0.5 gallons of absorbent per 1000 actual cubic feet of feed gas. If the slip stream of regenerated solvent treated for heat stable salt removal is insufficient to provide the desired L/G ratio, the absorbent in the secondary absorption zone can be recirculated as required to attain the desired L/G ratio. Alternatively, make-up water can be introduced into the secondary absorption zone to adjust the L/G ratio as desired. The recirculated absorbent or make-up water, as the case may be, can be introduced to the secondary absorption zone at any point in the upper portion of the absorption zone (not necessarily the top tray). Preferably, at least a portion of the spent absorbent, i.e., partially loaded diamine, from the secondary absorption zone is used as lean solvent in the primary absorption zone since it still has absorption capacity for sulfur dioxide. Typically the first amine group of the partially loaded diamine will be in a salt form associated with sulfite anions and the second amine group will be in free base form.

In the aspect of the present invention described above wherein a secondary absorption zone is employed, it is often desirable to convert the treated amine from the heat stable salt removal step, wherein the first amine group is in free base form, to a salt form in order to maintain low volatility of the diamine. In a preferred aspect of the invention, this can be accomplished by the formation of a salt having a weaker strength than a sulfite salt, e.g., a carbonate salt, by contacting the treated amine with a source of carbon dioxide. As used herein the term "carbonate" as a salt or anion is intended to include carbonate anions as $CO_3^{-2}$ and bicarbonate anions as $HCO_3^-$. Since the feed streams process by the present invention often comprise carbon dioxide, and since the carbon dioxide is typically present in the product gas, it is preferred to contact the treated absorbent with at least a portion of the product gas from either or both of the primary absorption zone or the secondary absorption zone in order to convert the first amine group to a salt form having carbonate anions associated therewith. Typically, less than 10 percent, preferably less than 5 percent, of the total product gas needs to be contacted with the treated amine to form the carbonate salt. Preferably, the level of carbonate anions will be up to about 1 equivalent of carbonate salt per mole of diamine. When the absorbent containing the carbonate salt is contacted with the feed gas containing sulfur dioxide, the carbonate anions are displaced by sulfite anions and the carbon dioxide is liberated in the product gas. The sulfite salt then has capacity for absorbing sulfur dioxide. The above-described carbon dioxide contacting step can be performed in a separate contacting zone or in the upper section of the primary or secondary absorption zones.

Essentially any feed gas containing sulfur dioxide can be used in the process of the present invention. Typically, however, the feed/gas/streams will contain sulfur dioxide, carbon dioxide and water in addition to other components such as carbon monoxide, hydrogen sulfide, hydrocarbons having 1 to 4 carbon atoms, oxygen and nitrogen, for example. Typically, the level sulfur dioxide is from about 500 to 200,000 ppmv. Often, the level of sulfur dioxide will be from about 1000 to 10,000 ppmv. Typical levels of carbon dioxide range from about 2 to 30 volume percent, although levels of carbon dioxide as high as 90 volume percent or more can be processed, and typical water levels range from about 1 to 12 volume percent.

FIG. 1 illustrates a process flow diagram in accordance with the present invention. The process flow diagram is provided for illustrative purposes and is not intended to limit the scope of the claims which follow. Those skilled in the art will recognize that the process flow diagram does not illustrate various common pieces of process equipment such as, for example, heat exchangers, pumps, compressors, distillation columns, heaters, process control systems and the like.

The entire process illustrated in FIG. 1 operates at about atmospheric pressure. A feed gas stream comprising about 2000 ppmv sulfur dioxide, 10 mole percent carbon dioxide, 5 mole percent water, with the balance comprising oxygen and nitrogen, is introduced to the process via line 10 and passed to a primary absorption zone 100. In absorption zone 100, the feed gas stream is contacted with a primary lean solvent stream comprising hydroxyethyl piperzine wherein the first amine group is in a salt form associated with sulfite anions and the second amine group is in free base form. The primary lean solvent stream may contain other common ingredients, such as, for example, antifoams or antioxidants. Primary absorption zone 100 is maintained at a temperature of from about 100° to 160° F. and comprises an in-duct spray scrubber, the details of which are known to those skilled in the art. After absorption, the first amine group of the diamine in the primary rich solvent stream is in salt form associated with bisulfite anions and the second amine group is protonated and is also associated with bisulfite anions.

A primary rich solvent stream comprising absorbed sulfur dioxide and the diamine is withdrawn from absorption zone 100 and passed via line 12 to a regeneration zone 110. Typically, only a small fraction of the sulfur dioxide will be present as dissolved sulfur dioxide. Most of the absorbed sulfur dioxide will typically present in the form of bisulfite anions associated with the first and second amine groups. In regeneration zone 110, the bisulfite anions are converted to sulfite anions and the protonated second amine group is converted to free base form. Bisulfite anions associated with the second protonated amine group are converted to sulfur dioxide during regeneration. Regeneration zone 110 is operated under steam stripping conditions at a temperature of about 150° to 240° F. and contains a suitable number of distillation trays, which can be determined by one skilled in the art. A tail gas stream comprising sulfur dioxide is withdrawn from regeneration zone 110 via line 13. A regenerated solvent stream comprising the diamine wherein the first amine group is in salt form associated with sulfite anions and the second amine is in free base form is withdrawn from regeneration zone 110 via line 14.

Approximately 1 percent by volume of regenerated solvent stream 14 is diverted via line 16 and passed to a a heat stable salt removal zone 120. Heat stable salt removal zone 120 comprises an electrodialysis unit wherein the heat stable anions, e.g., salts associated with sulfate anions, are removed from the heat stable amine salts in the regenerated solvent. Further details concerning the apparatus and operating conditions for the electrodialysis unit are known to those skilled in the art. A waste stream comprising heat stable anions is withdrawn from heat stable salt removal zone 120 via line 17.

A treated solvent stream containing the diamine wherein essentially all the amine groups are in free base form is withdrawn from heat stable salt removal zone 120 via line 18 and passed to a carbonation zone 130 wherein the treated solvent stream is contacted with a secondary effluent gas stream containing carbon dioxide via line 24, the source of which is hereinafter identified. Carbonation zone 130 comprises a simple absorption zone with two absorption trays. In carbonation zone 130, the first amine group in the diamine is converted to a salt form associated with carbonate anions. A product gas stream comprising carbon dioxide, water and about 10 ppmv sulfur dioxide, or less, is withdrawn from carbonation zone 130 via line 25.

A secondary lean solvent stream comprising a diamine wherein the first amine group is in salt form associated with carbonate anions and the second amine group is substantially in free base form is withdrawn from carbonation zone 130 via line 19 and introduced to a secondary absorption zone 140 wherein the secondary lean solvent stream is contacted with a primary effluent gas stream withdrawn via line 21 from primary absorption zone 100. In secondary absorption zone 140, the sulfur dioxide content in the primary effluent gas is reduced from a level of about 100 ppmv to a level of about 10 ppmv. Secondary absorption zone 140 is operated at a temperature of from about 100° to 150° F. and contains similar equipment to primary absorption zone 100.

A secondary effluent gas stream comprising about 10 ppmv sulfur dioxide, carbon dioxide and water is withdrawn from secondary absorption zone 140 via line 22. About 99 percent of stream 22 is removed from the process as product via line 23 and the remaining 1 percent is passed to carbonation zone 130 as hereinbefore described.

A secondary rich solvent stream comprising the diamine wherein the first amine group is in sulfite form and the second amine group is in free base form is withdrawn from secondary absorption zone 140 via line 20 and combined with the remaining portion of the regenerated solvent stream in line 15 to form the primary lean solvent stream 11 as hereinbefore described.

The following examples are provided for illustrative purposes and are not intended to limit the scope of the claims which follow.

In order to determine the increase in loading capacity between a diamine (hydroxyethyl piperazine) when the first amine group is in a salt form associated with sulfate anions, i.e., heat stable salt, and when the first amine group is in salt form associated with sulfite anions, the following experiment was conducted.

An aqueous solution containing 36 weight percent hydroxyethyl piperazine was prepared. The amine solution was added to a 200 milliliter round bottom flask which was fitted with a septum, condenser, sparger and stirring bar. A stream of pure sulfur dioxide gas was then slowly passed through the solution while the solution's weight was monitored gravimetrically to control the extent of sulfur dioxide absorption. After sufficient equilibrium was obtained, a gas phase sample was withdrawn from the head space of the solution and was immediately analyzed by gas chromotography for the sulfur dioxide gas concentration which was in equilibrium with the solution. A Varian model 3600 gas chromatograph with a Porapak T 60/80 mesh column, which was obtained from Supelco, Oakville, Ontario, was used in the gas chromatograph. The above procedure was repeated for sulfur dioxide gas phase concentrations ranging from about 500 ppmv to about 18000 ppmv at temperatures of 60° C. and 95° C. The lower temperature represents a typical absorption temperature and the higher temperature represents a typical regeneration temperature.

The liquid molar loading for each sulfur dioxide gas phase concentration was calculated for the 60° C. equilibrium condition by dividing the weight of sulfur dioxide absorbed in the solution by the weight of amine in the solution and converting to a molar basis. For a typical regeneration case of about 1000 ppmv in the gas phase, the molar loading for the regenerated diamine at 95° C. was determined for the diamine in sulfite salt form and for the diamine in sulfate salt form. The delta loading for each sulfur dioxide gas phase concentration was then calculated by subtracting the molar loading at 95° C. from the molar loading at 60° C. Then for each sulfur dioxide gas phase concentration, the delta loading for the diamine in sulfate salt form was subtracted from the delta loading for the diamine in sulfite salt form in order to obtain the increase in delta loading between the two diamines. Table 1 below sets forth the results of the above described experiment.

TABLE 1

| Gas Phase Concentration of $SO_2$, ppmv | Increase in a Delta Loading for hydroxyethyl piperazine (sulfite salt) vs. hydroxyethyl piperazine (sulfate salt), mole $SO_2$/mole diamine |
|---|---|
| 500 | 0.10 |
| 2000 | 0.15 |
| 4000 | 0.18 |
| 6000 | 0.20 |
| 8000 | 0.18 |
| 10000 | 0.17 |
| 18000 | 0.14 |

It can be seen from Table 1 that the increase in delta loading ranged from about 0.10 to 0.20 moles of $SO_2$ per mole of diamine. The average increase in delta loading was 0.16 moles of sulfur dioxide per mole of diamine.

Figure 2:
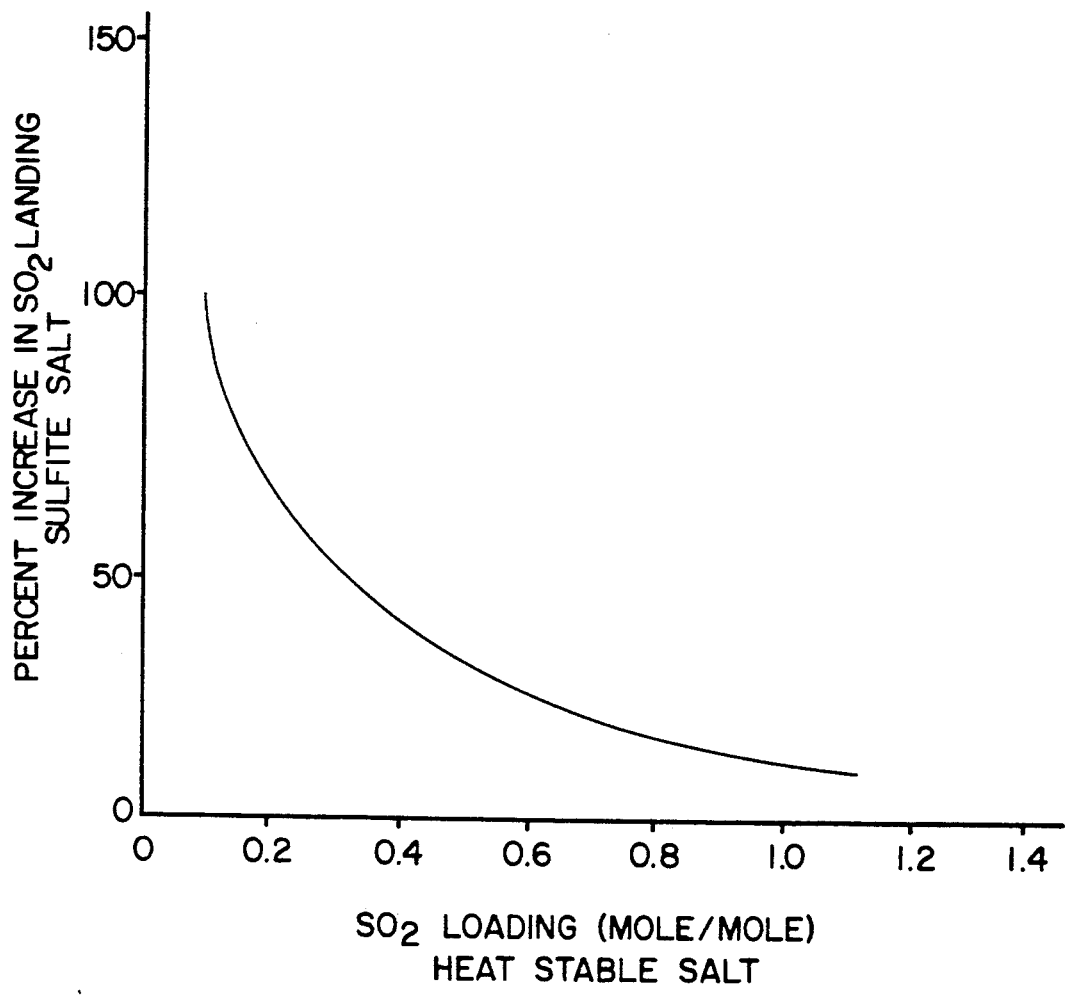
FIG. 2 graphically illustrates the effect of heat stable salts on sulfur dioxide absorption capacity.

FIG. 2 illustrates the effect of the average increase in delta loading as a percentage increase over various sulfur dioxide loadings on a diamine where the first amine group is heat stable salt. For instance, if the delta loading for the diamine in heat stable salt form is 0.32 moles of $SO_2$ per mole of diamine, it can be seen from FIG. 2 that in accordance with the present invention, the increase in delta loading is 0.16 moles of sulfur dioxide per mole of diamine, which corresponds to a 50 percent increase in absorption capacity.

Such an increase in absorption capacity can be utilized to process more feed gas or, alternatively, can be used to process the same quantity of feed gas at a lower L/G ratio. For instance, in a typical case where the feed gas concentration of sulfur dioxide is about 2000 ppmv, the sulfur dioxide loading is 0.39 grams per gram mole where the first amine group on the diamine is in heat stable salt form. For this case an L/G ratio of about 0.6 gallons of solvent per 1000 actual cubic feet of feed gas is required. In accordance with the process of the present invention, the capacity can be increased by about 0.16 moles of sulfur dioxide per mole of diamine (average), by maintaining the first amine group in salt form associated with sulfite anions. As a result, the increase in absorption capacity of the diamine of the present invention is about 41 percent greater than when the first amine group is a heat stable salt i.e., $[(0.39+0.16)/0.39 \times 100]$. This calculation assumes that 100 percent of the first amine groups are in sulfite salt form. If, for instance, the heat stable salt removal step is effective to provide 75 percent of the first amine groups in sulfite salt form and 25 percent of the first amine groups in sulfate salt form, the increase in delta loading capacity would be equal to 75 percent of the above increase, i.e., 30 percent. Accordingly, to treat the same quantity of feed gas, the L/G ratio could be reduced by about 30 percent which, of course, would translate into considerable savings in solvent circulation and regeneration costs.

We claim:

1. In a process for the removal of sulfur dioxide from a sulfur dioxide-containing feed gas stream by absorption with a diamine, said process comprising:
    (a) passing the feed gas stream to a primary absorption zone wherein the feed gas stream is contacted with a primary lean solvent stream containing water and a regenerated diamine at conditions effective to absorb sulfur dioxide and form a spent diamine comprising said absorbed sulfur dioxide; wherein during said absorption contacting, heat stable salts having heat stable anions associated therewith are formed as a byproduct;
    (b) withdrawing a primary effluent gas stream at least partially depleted in sulfur dioxide relative to the feed gas stream from the primary absorption zone;
    (c) withdrawing primary rich solvent stream comprising heat stable salts and said spent diamine from the primary absorption zone;
    (d) passing the primary rich solvent stream to a regeneration zone wherein the rich solvent stream is regenerated at conditions effective to desorb sulfur dioxide;
    (e) withdrawing a tail gas stream comprising sulfur dioxide from the regeneration zone;
    (f) withdrawing a regenerated solvent stream comprising the regenerated diamine, water and heat stable salts from the regeneration zone; and
    (g) recycling at least a portion of the regenerated solvent stream to the primary absorption zone to comprise at least a portion of the primary lean solvent stream;

the improvement which comprises removing heat stable anions from the heat stable salts in at least one of the primary rich solvent stream or the regenerated solvent stream to provide less than 1 equivalent of heat stable salts per mole of diamine in the primary lean solvent stream, such that the regenerated solvent stream comprises;
(i) a first amine group in salt form having sulfite anions associated therewith, wherein the sulfite anions have absorption capacity for sulfur dioxide; and
(ii) a second amine group in free base form, wherein the second amine group has absorption capacity for sulfur dioxide.

2. The process of claim 1 wherein the heat stable anions are removed by passing a portion of the regenerated solvent stream to a heat stable salt rejection zone oat conditions effective to separate heat stable anions from heat stable salts in the regenerated solvent stream and provide a waste stream comprising heat stable anions and a treated solvent stream containing a treated diamine comprising a first amine group in free base form and a second amine group in free base form, wherein both first and second amine groups of the treated amine have absorption capacity for sulfur dioxide.

3. The process of claim 1 wherein the primary lean solvent stream comprises less than 0.8 equivalent of heat stable salts per mole of diamine.

4. The process of claim 3 wherein the primary lean solvent stream comprises from about 0.05 to 0.6 equivalent of heat stable salts per mole of diamine.

5. The process of claim 2 wherein the portion of the regenerated solvent stream passed to the heat stable salt rejection zone is less than about 10% of the regenerated solvent stream.

6. The process of claim 5 wherein the portion of the regenerated solvent stream passed to the heat stable salt rejection zone is less than about 5% of the regenerated solvent stream.

7. The process of claim 1 wherein at least about 20% of the amine groups in salt form in the regenerated diamine have sulfite anions associated therewith.

8. The process of claim 7 wherein at least about 50% of the amine groups in salt form in the regenerated diamine have sulfite anions associated therewith.

9. The process of claim 1 wherein the diamine is a water-soluble half-salt of a diamine having a pKa value for the first amine group, in free base form, of from about 8.0 to 10.6 and a pKa value for the second amine group, in free base form, of from about 4.5 to 7.3.

10. The process of claim 9 wherein the diamine is selected from the group consisting of
N,N',N'-(trimethyl)-N-(2-hydroxyethyl)-ethylenediamine, N-methyl,
N'-(2-hydroxyethyl)-piperazine,
N-(2-hydroxyethyl)-piperazine,
N,N'-bis(2-hydroxyethyl)-piperazine, and mixtures thereof.

11. The process of claim 2 wherein at least 60% of the amine groups in the treated diamine, on average, are in the free base form.

12. The process of claim 11 wherein at least 75% of the amine groups in the treated diamine, on average, are in the free base form.

13. The process of claim 2 further comprising combining the treated solvent stream with the remaining portion of the regenerated solvent stream to comprise the primary lean solvent stream.

14. The process of claim 2 further comprising passing the primary effluent gas stream to a secondary absorption zone wherein the primary effluent gas stream is contacted at absorption conditions with a secondary lean solvent stream comprising the treated solvent stream, withdrawing a secondary gas effluent stream at least partially depleted in sulfur dioxide relative to the primary effluent gas stream, withdrawing a secondary rich solvent stream comprising sulfur dioxide and a partially loaded diamine and introducing at least a portion of the secondary rich solvent stream to the primary absorption zone.

15. The process of claim 14 further comprising recycling a sufficient portion of the secondary rich effluent stream to the secondary absorption zone to maintain an L/G of at least 0.1 gallons of solvent per 1000 actual cubic feet of primary gas effluent passed to the secondary absorption zone.

16. The process of claim 14 wherein the feed gas stream comprises carbon dioxide and at least a portion of the carbon dioxide is present in at least one of the primary effluent gas stream or the secondary effluent gas stream.

17. The process of claim 16 further comprising contacting the treated solvent stream with at least a portion of at least one of the primary effluent gas stream or the secondary effluent gas stream containing carbon dioxide at conditions effective to convert the first amine group in the diamine to a salt form having carbonate anions associated therewith prior to passing the treated solvent stream to the secondary absorption zone.

18. The process of claim 1 wherein during said absorption contacting, sulfite anions are converted to bisulfite anions and the second amine group is protonated, and during said regeneration, bisulfite anions are converted to sulfite anions and the second amine group is converted to free base form.

19. The process of claim 1 wherein the sulfur dioxide absorption capacity of the regenerated diamine is at least 20 percent greater than a diamine absorbent where the first amine group is in a salt form having heat stable anions associated therewith.

20. The process of claim 19 wherein the sulfur dioxide absorption capacity of the regenerated diamine is at least 50 percent greater than a diamine absorbent where the first amine group is in a salt form having heat stable anions associated therewith.

* * * * *